(12) United States Patent
Alam

(10) Patent No.: US 11,387,674 B1
(45) Date of Patent: *Jul. 12, 2022

(54) WIRELESS POWER TRANSMITTERS FOR TRANSMITTING POWER AT EXTENDED SEPARATION DISTANCES UTILIZING CONCAVE SHIELDING

(71) Applicant: NuCurrent, Inc., Chicago, IL (US)

(72) Inventor: Md Nazmul Alam, Lombard, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,148

(22) Filed: Dec. 23, 2020

(51) Int. Cl.
*H02J 50/00* (2016.01)
*H02J 50/90* (2016.01)
*H02J 50/12* (2016.01)
*H02J 50/70* (2016.01)

(52) U.S. Cl.
CPC ........... *H02J 50/005* (2020.01); *H02J 50/12* (2016.02); *H02J 50/70* (2016.02); *H02J 50/90* (2016.02)

(58) Field of Classification Search
CPC ....................................................... H02J 50/70
USPC ......................................................... 307/149
See application file for complete search history.

(56) References Cited

U.S. PATENT DOCUMENTS

| 6,075,433 | A | 6/2000 | Ono et al. |
| 9,912,187 | B2 | 3/2018 | Sultenfuss et al. |
| 10,410,789 | B2 | 9/2019 | Kurs |
| 2004/0261422 | A1 | 12/2004 | McEuen et al. |
| 2005/0068019 | A1 | 3/2005 | Nakamura et al. |
| 2005/0288743 | A1 | 12/2005 | Ahn et al. |
| 2006/0209487 | A1 | 9/2006 | Schmidt et al. |
| 2011/0018498 | A1 | 1/2011 | Soar |
| 2011/0062793 | A1 | 3/2011 | Azancot et al. |

(Continued)

FOREIGN PATENT DOCUMENTS

| KR | 101213090 B1 | 12/2012 |
| KR | 20190087733 A | 7/2019 |

(Continued)

OTHER PUBLICATIONS

PCTUS2021030315 International Search Report and Written Opinion, dated Aug. 20, 2021, 11 pages.

(Continued)

*Primary Examiner* — Joseph Chang
(74) *Attorney, Agent, or Firm* — Lee Sullivan Shea & Smith LLP

(57) ABSTRACT

A power transmitter includes a control and communications unit and an inverter circuit configured to receive input power and convert the input power to a power signal. The power transmitter further includes a shielding comprising a ferrite core including a magnetic backing and a magnetic ring, the magnetic backing and magnetic ring, in combination, defining a concave cavity, the magnetic ring defining a bottom portion, a top portion, and an inner side wall between the bottom portion and the top portion, the inner sidewall defining an outward extending shape, the outward extending shape extending radially outward from the bottom portion to the top portion. The power transmitter further includes a coil configured to transmit the power signal to a power receiver, the coil formed of wound Litz wire and positioned within the concave cavity of the shielding and radially inward from the inner wall.

20 Claims, 13 Drawing Sheets

(56) References Cited

U.S. PATENT DOCUMENTS

| | | |
|---|---|---|
| 2012/0217111 A1 | 8/2012 | Boys et al. |
| 2013/0058380 A1 | 3/2013 | Kim et al. |
| 2013/0069586 A1 | 3/2013 | Jung et al. |
| 2013/0082536 A1 | 4/2013 | Taylor et al. |
| 2013/0127580 A1 | 5/2013 | Dobbs |
| 2013/0162201 A1 | 6/2013 | Yeh |
| 2013/0169062 A1 | 7/2013 | Maikawa et al. |
| 2013/0307468 A1 | 11/2013 | Lee et al. |
| 2014/0239732 A1 | 8/2014 | Mach et al. |
| 2014/0354223 A1 | 12/2014 | Lee et al. |
| 2015/0091389 A1 | 4/2015 | Byrne et al. |
| 2015/0214752 A1 | 7/2015 | Gluzman et al. |
| 2015/0222129 A1 | 8/2015 | McCauley et al. |
| 2015/0270776 A1 | 9/2015 | Mallik et al. |
| 2015/0333532 A1* | 11/2015 | Han .................. H02J 50/70 |
| | | 307/104 |
| 2016/0006289 A1 | 1/2016 | Sever et al. |
| 2016/0118179 A1 | 4/2016 | Park et al. |
| 2016/0181821 A1 | 6/2016 | Xu et al. |
| 2017/0090531 A1 | 3/2017 | Forbes et al. |
| 2017/0129344 A1 | 5/2017 | Islinger et al. |
| 2017/0194092 A1 | 7/2017 | Vix |
| 2017/0245679 A1 | 8/2017 | Watts |
| 2017/0287626 A1 | 10/2017 | Larson et al. |
| 2017/0288465 A1 | 10/2017 | Sugasawa et al. |
| 2017/0331335 A1 | 11/2017 | Brooks et al. |
| 2017/0368945 A1 | 12/2017 | Park et al. |
| 2018/0204674 A1 | 7/2018 | Cho et al. |
| 2018/0277926 A1 | 9/2018 | Park et al. |
| 2019/0267845 A1 | 8/2019 | Maniktala |
| 2019/0384603 A1 | 12/2019 | Kim et al. |
| 2019/0394906 A1 | 12/2019 | Smith et al. |
| 2020/0094700 A1 | 3/2020 | Hui |
| 2020/0177028 A1 | 6/2020 | Esteban et al. |
| 2020/0373072 A1 | 11/2020 | Leem |
| 2021/0075255 A1 | 3/2021 | Nutting et al. |
| 2021/0159736 A1* | 5/2021 | Miyamoto .............. H02J 50/70 |
| 2021/0296999 A1 | 9/2021 | Taleb et al. |
| 2021/0354577 A1 | 11/2021 | Books et al. |

FOREIGN PATENT DOCUMENTS

| | | |
|---|---|---|
| KR | 20200113098 A | 10/2020 |
| WO | 2014092339 A1 | 6/2014 |
| WO | 2015064815 A1 | 5/2015 |
| WO | 2019148070 A2 | 8/2019 |

OTHER PUBLICATIONS

International Searching Authority, PCT International Search Report and Written Opinion, PCT International Application No. PCT/US2021/064964 dated Apr. 28, 2022, 14 pages.

International Searching Authority, PCT International Search Report and Written Opinion, PCT International Application No. PCT/US2022/014409 dated May 16, 2022, 8 pages.

* cited by examiner

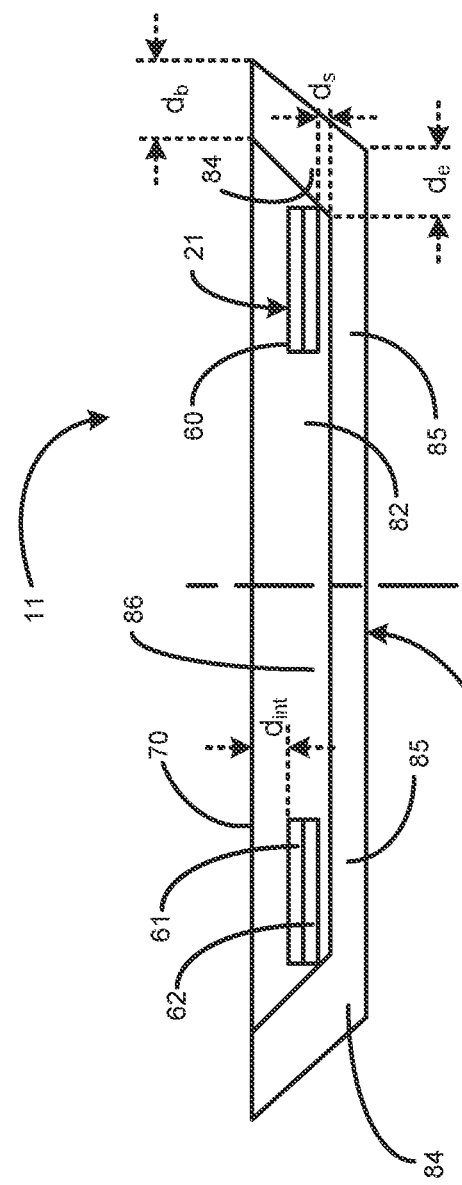
FIG. 8A
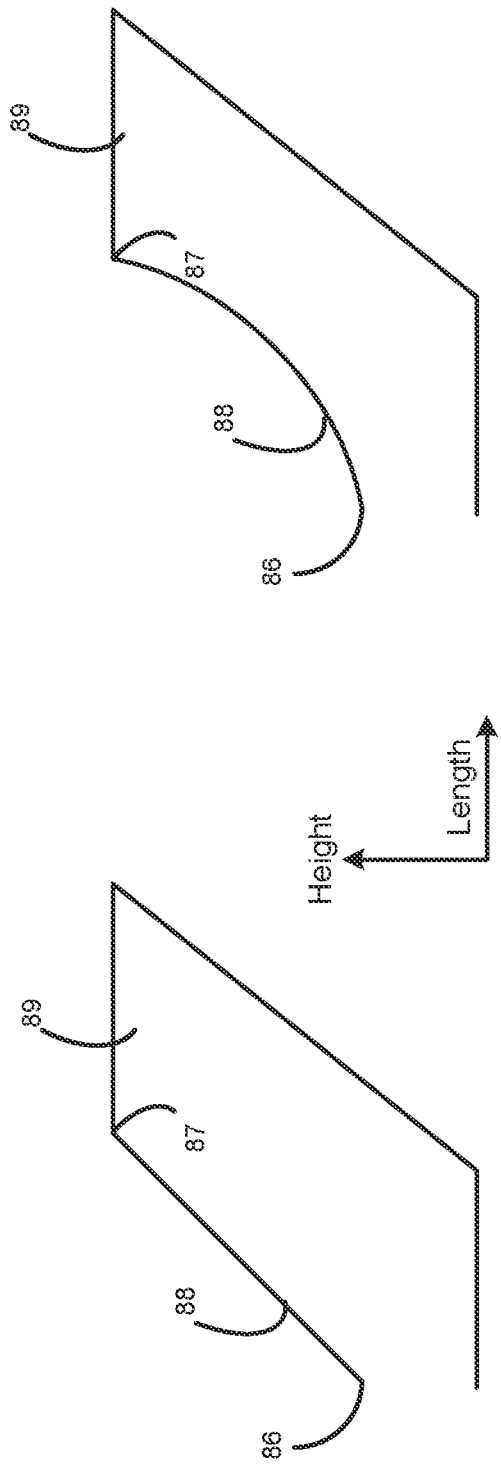
FIG. 8B
FIG. 8C

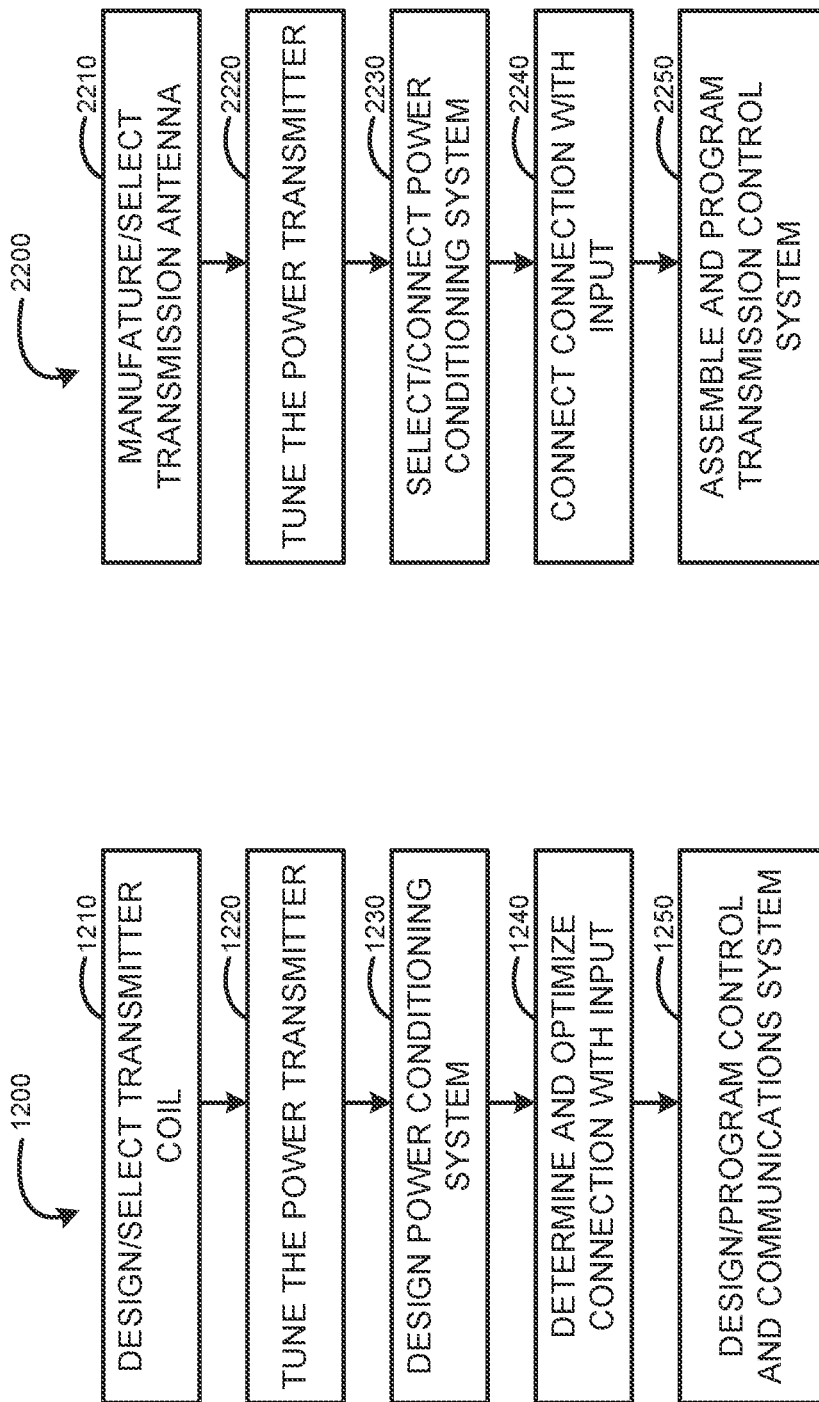

WIRELESS POWER TRANSMITTERS FOR TRANSMITTING POWER AT EXTENDED SEPARATION DISTANCES UTILIZING CONCAVE SHIELDING

TECHNICAL FIELD

The present disclosure generally relates to systems and methods for wireless transfer of electrical power and, more particularly, to wireless power transmitters for transmitting power at extended separation distances.

BACKGROUND

Wireless power transfer systems are used in a variety of applications for the wireless transfer of electrical energy, electrical power signals, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Because some wireless power transfer systems are operable and/or most efficient in the near-field, some transmitters may be limited to having operability only at restrictively small gaps between the transmitter coil and the receiver coil. To that end, typical wireless power transmitters under the Wireless Power Consortium's Qi™ standard may be limited to operability at a maximum coil-to-coil separation gap (which may be referred to herein as a "separation gap" or "gap") of about 3 millimeters (mm) to about 5 mm. The separation gap is sometimes known as the Z-height or Z-distance and is generally measured as the distance between the transmitter coil and receiver coil.

As the adoption of wireless power grows, commercial applications are requiring a power transmitter capable of transferring power to a power receiver with a gap greater than 3-5 mm. By way of example, cabinets and/or counter tops may be more than 3-5 mm thick and as a result, prevent wireless charging through such furniture. As another example, modern mobile devices may be used with cases, grip devices, and/or wallets, among other things, that can obstruct wireless power transmission to the mobile device and/or create a separation gap that disallows operability of wireless power transmission. Legacy wireless power transmitter designs further may be incapable of desired commercial applications (e.g., through object chargers, under table chargers, infrastructure chargers, ruggedized computing device charging, among other things), due to the limitations in separation gap inherent to legacy, near-field wireless power transfer systems. Increasing the separation gap, while keeping satisfactory performance (e.g., thermal performance, transfer/charging speed, efficiency, etc.) will increase the number of commercial applications that can utilize wireless power.

SUMMARY

New wireless power transmitters and/or associated base stations are desired that are capable of delivering wireless power signals to a power receiver at a separation gap larger than the about 3 mm to about 5 mm separation gaps of legacy transmitters.

In an embodiment, the overall structure of the transmitter is configured in a way that allows the transmitter to transfer power at an operating frequency of about 87 kilohertz (kHz) to about 360 kHz and achieve the same and/or enhanced relative characteristics (e.g., rate of power transfer, speed of power transfer, power level, power level management, among other things) of power transfer as legacy transmitters that operated in that frequency range. As a result, the separation gap may be increased from about 3-5 mm to around 15 mm or greater using the overall structure of the transmitter. In an embodiment, a transmitter may be configured with a ferrite core that substantially surrounds the transmitter antenna on three sides. The only place that the ferrite core does not surround the transmitter antenna is on the top (e.g., in the direction of power transfer) and where the power lines connect to the transmitter antenna. This overall structure of the transmitter allows for the combination of power transfer characteristics, power level characteristics, self-resonant frequency restraints, design requirements, adherence to standards bodies' required characteristics, bill of materials (BOM) and/or form factor constraints, among other things, that allow for power transfer over larger separation gaps.

Transmission of one or more of electrical energy, electrical power, electromagnetic energy or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In accordance with one aspect of the disclosure, a power transmitter for wireless power transfer at an operating frequency selected from a range of about 87 kilohertz (kHz) to about 360 kHz is disclosed. The power transmitter includes a control and communications unit and an inverter circuit configured to receive input power and convert the input power to a power signal. The power transmitter further includes a shielding comprising a ferrite core including a magnetic backing and a magnetic ring, the magnetic backing and magnetic ring, in combination, defining a concave cavity, the magnetic ring defining a bottom portion, a top portion, and an inner side wall between the bottom portion and the top portion, the inner sidewall defining an outward extending shape, the outward extending shape extending radially outward from the bottom portion to the top portion. The power transmitter further includes a coil configured to transmit the power signal to a power receiver, the coil formed of wound Litz wire and positioned within the concave cavity of the shielding and radially inward from the inner wall.

In a refinement, the outward extending shape defines one or more of a slope, a curve, or combinations thereof.

In a refinement, the coil has an outer diameter length in a range of about 40 mm to about 65 mm.

In a refinement, the coil has an inner diameter length in a range of about 20 mm to about 45 mm.

In a refinement, the coil has a thickness in a range of about 2 mm to about 3 mm.

In a refinement, the Litz wire is a bifilar Litz wire.

In a refinement, the coil includes, at least, a first layer of the wound Litz wire and a second layer of the wound Litz wire.

In a further refinement, the first layer includes a first number of turns in a range of about 2 turns to about 5 turns, and wherein the second layer includes a second number of turns in a range of about 2 turns to about 5 turns.

In another refinement, the Litz wire has a diameter in a range of about 1 mm to about 1.5 mm and includes a plurality of strands, the plurality of strands including a number of strands in a range of about 80 strands to about 120 strands.

In a further refinement, each of the plurality of strands has a diameter in a range of about 0.05 mm to about 0.1 mm.

In accordance with another aspect of the disclosure, a base station for wireless power transfer at an operating frequency selected from a range of about 87 kilohertz (kHz) to about 360 kHz is disclosed. The base station includes an interface surface, a control and communications unit and an inverter circuit configured to receive input power and convert the input power to a power signal. The base station further includes a shielding comprising a ferrite core including a magnetic backing and a magnetic ring, the magnetic backing and magnetic ring, in combination, defining a concave cavity, the magnetic ring defining a bottom portion, a top portion, and an inner side wall between the bottom portion and the top portion, the inner sidewall defining an outward extending shape, the outward extending shape extending radially outward from the bottom portion to the top portion. The base station further includes a coil configured to transmit the power signal to a power receiver, the coil formed of wound Litz wire and positioned within the concave cavity of the shielding and radially inward from the inner wall.

In a refinement, the interface surface is separated from the coil by an interface gap distance, the interface gap distance in a range of about 8 millimeters (mm) to about 10 mm.

In a refinement, the outward extending shape defines one or more of a slope, a curve, or combinations thereof.

In a refinement, the shielding is an E-Core type shielding and the cavity is configured in an E-shape configuration.

In a refinement, the base station further includes at least one user feedback mechanism configured for aiding a user in aligning a power receiver with an active area for wireless power transmission via the coil, the power receiver configured to acquire near field inductive power from the coil.

In a further refinement, the at least one user feedback mechanism includes a marking on the interface surface to indicate the location of the active area.

In another further refinement, the at least one user feedback mechanism includes a visual feedback display, this is configured to indicate proper alignment of the power receiver with the active area.

In another further refinement, the at least one user feedback mechanism includes one or more of an audible feedback mechanism, a tactile feedback mechanism that is configured to indicated if the power receiver is in proper alignment with the active area or a tactile feedback mechanism that is configured to indicate if the power receiver is in proper alignment with the active area.

In accordance with yet another aspect of the disclosure, a power transmitter for wireless power transfer at an operating frequency selected from a range of about 87 kilohertz (kHz) to about 360 kHz is disclosed. The power transmitter includes a control and communications unit and an inverter circuit configured to receive input power and convert the input power to a power signal. The power transmitter further includes a shielding comprising a ferrite core including a magnetic backing and a magnetic ring, the magnetic backing and magnetic ring, in combination, defining a concave cavity, the magnetic ring defining a bottom portion, a top portion, and an inner side wall between the bottom portion and the top portion, the inner sidewall defining an outward extending shape, the outward extending shape extending radially outward from the bottom portion to the top portion. The outward extending shape defining one or more of a slope, a curve, or combinations thereof. The power transmitter further includes a coil configured to transmit the power signal to a power receiver, the coil formed of wound Litz wire and positioned within the concave cavity of the shielding and radially inward from the inner wall, the coil including a first layer of the wound Litz wire and a second layer of the wound Litz wire, each of the first layer and the second layer including a number of turns in a range of about 2 turns to about 5 turns.

These and other aspects and features of the present disclosure will be better understood when read in conjunction with the accompanying drawings.

BRIEF DESCRIPTION OF THE DRAWINGS

FIG. 8A is a cross-section of components of a base station, with which the power transmitter 20 is associated, in accordance with FIGS. 1-7 and the present disclosure.

FIG. 8B is a cross section of a sidewall of a shielding of the base station of FIG. 8A, in accordance with FIGS. 1-7 and the present disclosure.

FIG. 8C is a cross section of an alternative sidewall of a shielding of the base station of FIG. 8B, in accordance with FIGS. 1-7 and the present disclosure.

FIG. 12 is a flow chart for an exemplary method for designing a power transmitter, in accordance with FIGS. 1-11 and the present disclosure.

FIG. 13 is a flow chart for an exemplary method for manufacturing a power transmitter, in accordance with FIGS. 1-11 and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
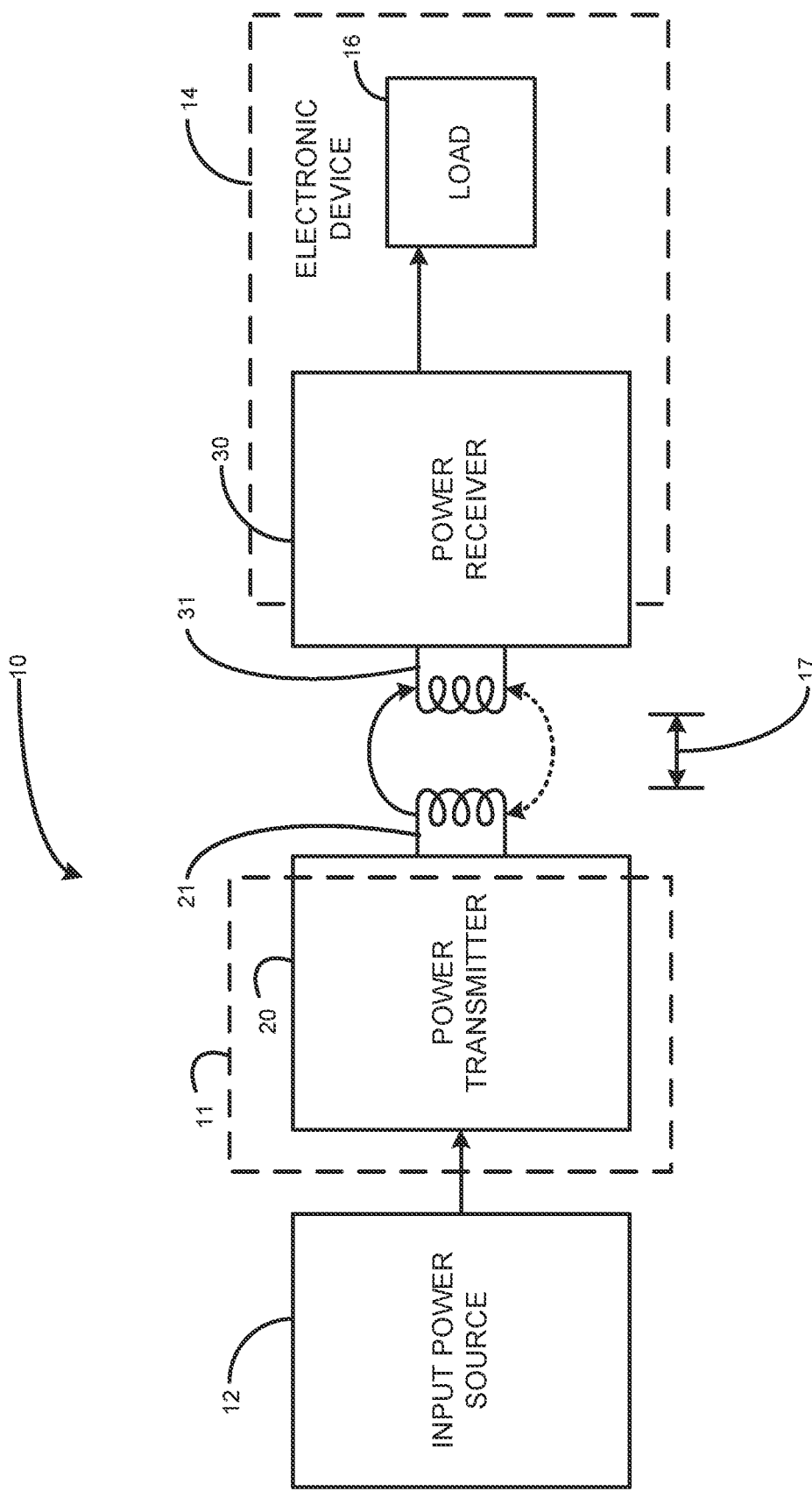
FIG. 1 is an exemplary block diagram of an embodiment of a wireless power transfer system, in accordance with an embodiment of the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power signals, and electromagnetic energy. Additionally, the wireless power transfer system 10 may provide for wireless transmission of electronically transmittable data ("electronic data") independent of and/or associated with the aforementioned electrical signals. Specifically, the wireless power transfer system 10 provides for the wireless transmission of electrical signals via near field magnetic coupling. As shown in the embodiment of FIG. 1, the wireless power transfer system 10 includes a power transmitter 20 and a power receiver 30. The power receiver 30 is configured to receive electrical energy, electrical power, electromagnetic energy, and/or electronic data from, at least, the power transmitter 20.

As illustrated, the power transmitter 20 and power receiver 30 may be configured to transmit electrical energy, via transmitter coil 21 and receiver coil 31, electrical power, electromagnetic energy, and/or electronically transmittable data across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as the gap 17, such as, but not limited to, air, a counter top, a casing for an electronic device, a grip device for a mobile device, a plastic filament, an insulator, a mechanical wall, among other things; however, there is no physical, electrical connection at such a separation distance or gap.

The combination of the power transmitter 20 and the power receiver 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the power transmitter 20 to the power receiver 30 remains possible.

The wireless power transfer system 10 operates when the power transmitter 20 and the power receiver 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the power transmitter 20 and the power receiver 30, in the system 10, may be represented by a resonant coupling coefficient of the system 10 and, for the purposes of wireless power transfer, the coupling coefficient for the system 10 may be in the range of about 0.01 and 0.9.

The power transmitter 20 may be operatively associated with a base station 11. The base station 11 may be a device, such as a charger, that is able to provide near-field inductive power, via the power transmitter 20, to a power receiver. In some examples, the base station 11 may be configured to provide such near-field inductive power as specified in the Qi™ Wireless Power Transfer System, Power Class 0 Specification. In some such examples, the base station 11 may carry a logo to visually indicate to a user that the base station 11 complies with the Qi™ Wireless Power Transfer System, Power Class 0 Specification.

The power transmitter 20 may receive power from an input power source 12. The base station 11 may be any electrically operated device, circuit board, electronic assembly, dedicated charging device, or any other contemplated electronic device. Example base stations 11, with which the power transmitter 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or lighting ports and/or adaptors, among other contemplated electrical components).

Electrical energy received by the power transmitter 20 is then used for at least two purposes: providing electrical power to internal components of the power transmitter 20 and providing electrical power to the transmitter coil 21. The transmitter coil 21 is configured to wirelessly transmit the electrical signals conditioned and modified for wireless transmission by the power transmitter 20 via near-field magnetic coupling (NFMC). Near-field magnetic coupling enables the transfer of electrical energy, electrical power, electromagnetic energy, and/or electronically transmissible data wirelessly through magnetic induction between the transmitter coil 21 and a receiving coil 31 of, or associated with, the power receiver 30. Near-field magnetic coupling may enable "inductive coupling," which, as defined herein, is a wireless power transmission technique that utilizes an alternating electromagnetic field to transfer electrical energy between two or more antennas/coils. Such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in at least one circuit magnetically coupled to the first.

In one or more embodiments, the inductor coils of either the transmitter coil 21 or the receiver coil 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 87 kHz to about 360 kHz (Qi™ interface standard). The operating frequencies of the coils 21, 31 may be operating frequencies designated by the International Telecommunications Union (ITU) in the Industrial, Scientific, and Medical (ISM) frequency bands.

As known to those skilled in the art, a "resonant frequency" or "resonant frequency band" refers to a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency band extends from about 87 kHz to about 360 kHz. In one or more embodiments the inductor coil of the receiver coil 31 is configured to resonate at a receiving antenna resonant frequency or within a receiving antenna resonant frequency band.

In some examples, the transmitting coil and the receiving coil of the present disclosure may be configured to transmit and/or receive electrical power at a baseline power profile having a magnitude up to about 5 watts (W). In some other examples, the transmitting coil and the receiving coil of the present disclosure may be configured to transmit and/or receive electrical power at an extended power profile, supporting transfer of up to 15 W of power.

The power receiver 30 is configured to acquire near-field inductive power from the power transmitter 20. In some examples, the power receiver 30 is a subsystem of an electronic device 14. The electronic device 14 may be any device that is able to consume near field inductive power as specified in the Qi™ Wireless Power Transfer System, Power Class 0 Specification. In some such examples, the electronic device 14 may carry a logo to visually indicate to a user that the electronic device 14 complies with the Specification.

The electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an automotive device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy, electrical power signals, and/or electromagnetic energy over a physical and/or wireless electrical connection, in the form of power signals that are, ultimately, utilized in wireless power transmission from the power transmitter 20 to the power receiver 30. Further, dotted lines are utilized to illustrate electronically transmittable data signals, which ultimately may be wirelessly transmitted from the power transmitter 20 to the power receiver 30.

Figure 2:
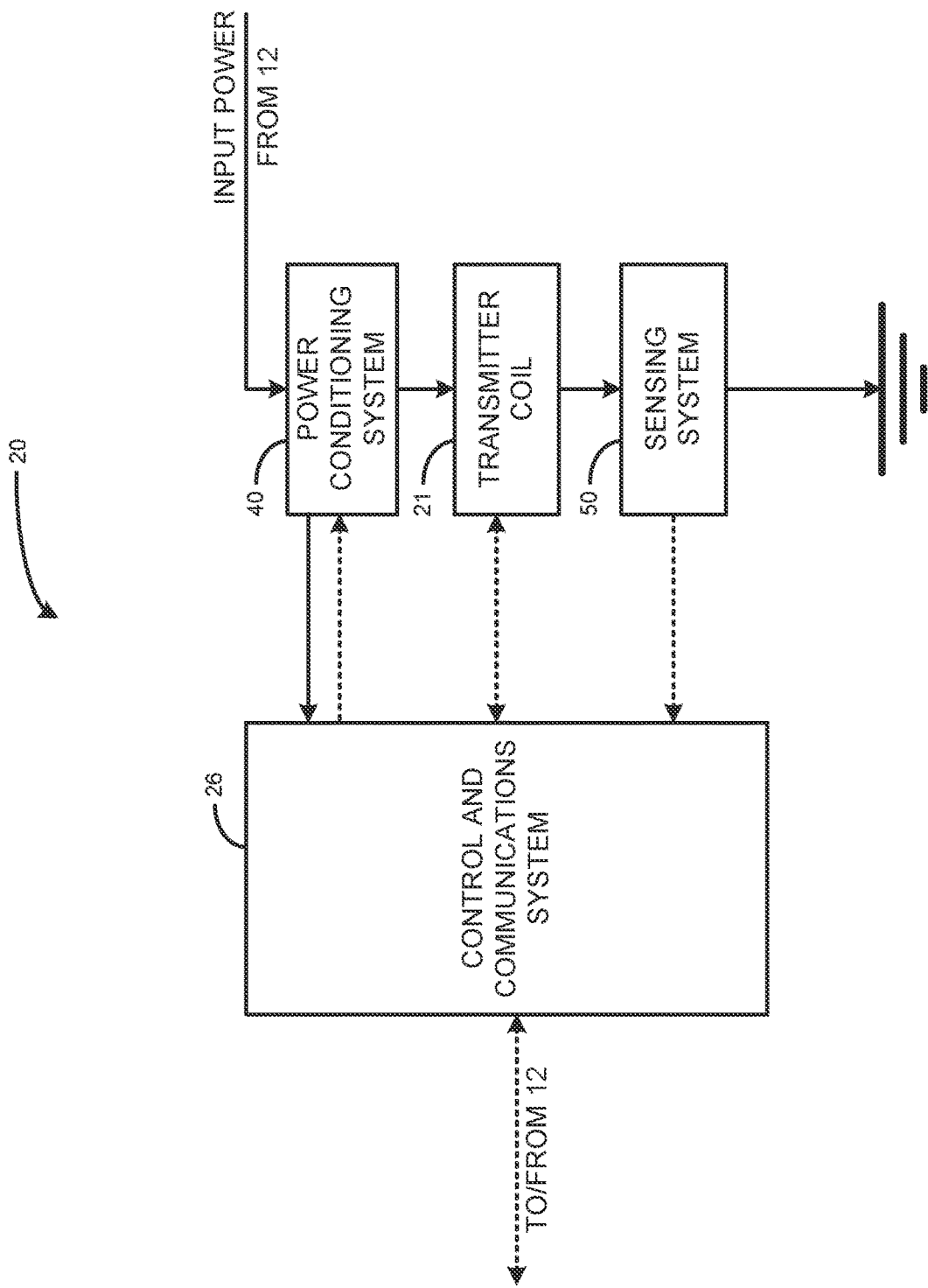
FIG. 2 is an exemplary block diagram for a power transmitter, which may be used in conjunction with the wireless power transfer system of FIG. 1, in accordance with FIG. 1 and an embodiment of the present disclosure.

Turning now to FIG. 2, the wireless power transfer system 10 is illustrated as a block diagram including example sub-systems of the power transmitter 20. The wireless transmission system 20 may include, at least, a power conditioning system 40, a control and communications system 26, a sensing system 50, and the transmission coil 21. A first portion of the electrical energy input from the input power source 12 is configured to electrically power components of the wireless transmission system 20 such as, but not limited to, the control and communications system 26. A second portion of the electrical energy input from the input power source 12 is conditioned and/or modified for wireless power transmission, to the power receiver 30, via the transmission coil 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

The control and communications system 26, generally, comprises digital logic portions of the power transmitter 20. The control and communications system 26 receives and decodes messages from the power receiver 30, executes the relevant power control algorithms and protocols, and drives the frequency of the AC waveform to control the power transfer. As discussed in greater detail below, the control and communications system 26 also interfaces with other subsystems of the power transmitter 20. For example, the control and communications system 26 may interface with other elements of the power transmitter 20 for user interface purposes.

Figure 3:
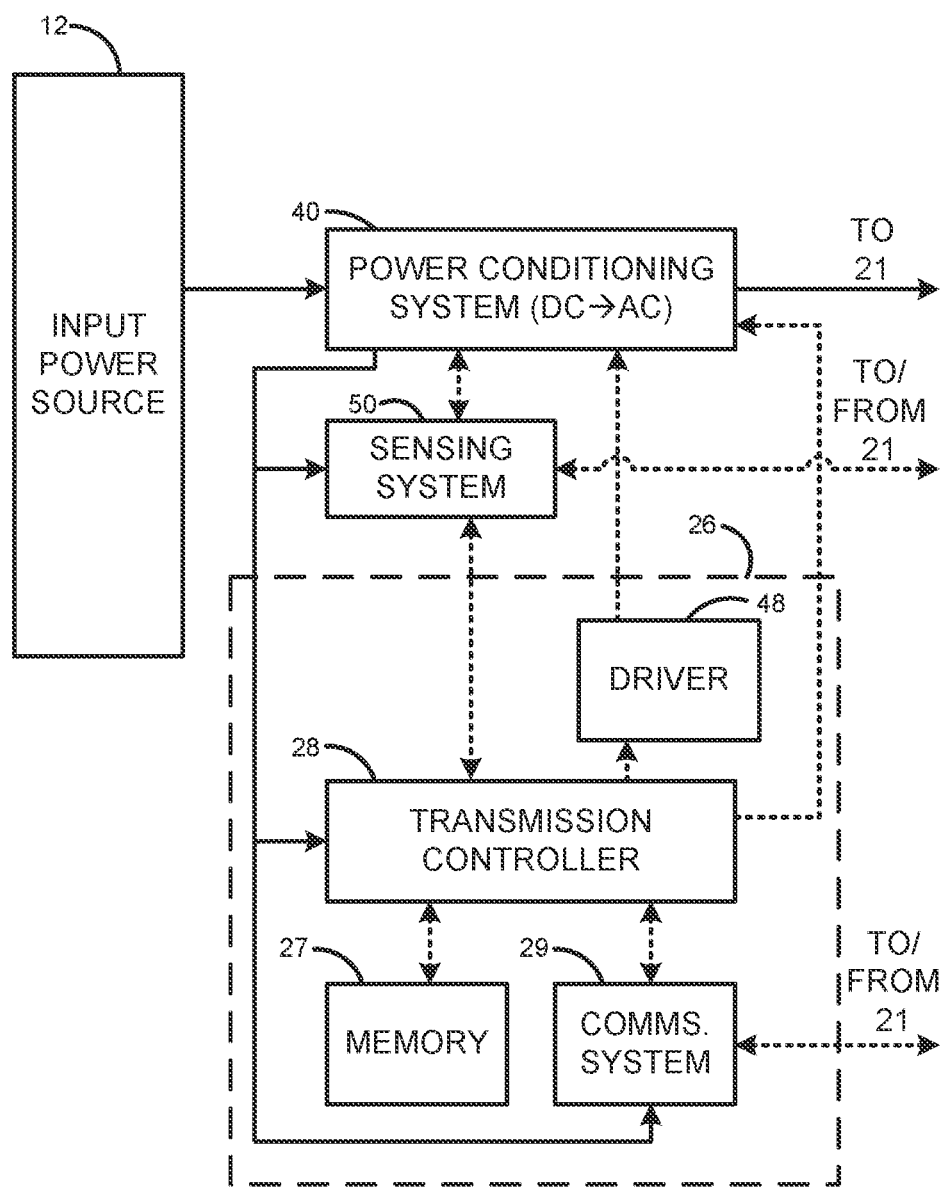
FIG. 3 is an exemplary block diagram for components of a control and communications system of the power transmitter of FIG. 2, in accordance with FIGS. 1-2 and an embodiment of the present disclosure.

Referring now to FIG. 3, with continued reference to FIGS. 1 and 2, subcomponents and/or systems of the control and communications system 26 are illustrated. The control and communications system 26 may include a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the power transmitter 20, and/or performs any other computing or controlling task desired. The transmission controller 28 may be a single controller or may include more than one controller disposed to control various functions and/or features of the power transmitter 20. Functionality of the transmission controller 28 may be implemented in hardware and/or software and may rely on one or more data maps relating to the operation of the power transmitter 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the control and communications system 26 are illustrated as independent components and/or circuits (e.g., the driver 48, the memory 27, the communications system 29, among other contemplated elements) of the control and communications system 26, such components may be integrated with the transmission controller 28. In some examples, the transmission controller 28 may be an integrated circuit configured to include functional elements of one or both of the transmission controller 28 and the power transmitter 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system 50 may include one or more sensors, wherein each sensor may be operatively associated with one or more components of the power transmitter 20 and configured to provide information and/or data. The term "sensor" is used in its broadest interpretation to define one or more components operatively associated with the power transmitter 20 that operate to sense functions, conditions, electrical characteristics, operations, and/or operating characteristics of one or more of the power transmitter 20, the power receiver 30, the input power source 12, the base station 11, the transmission coil 21, the receiver coil 31, along with any other components and/or subcomponents thereof.

Figure 4:
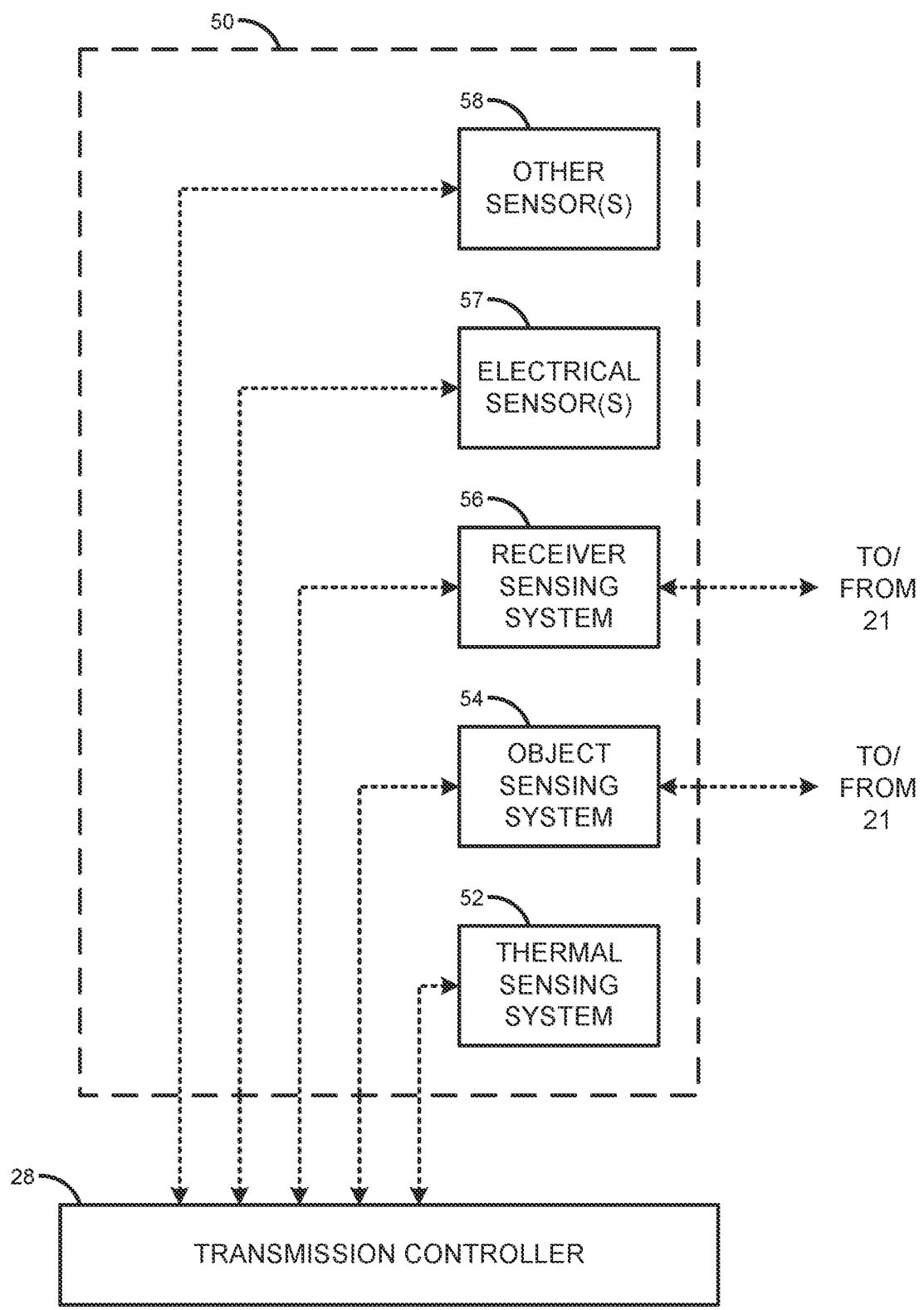
FIG. 4 is an exemplary block diagram for components of a sensing system of the control and communications system of FIG. 3, in accordance with FIGS. 1-3 and an embodiment of the present disclosure.

As illustrated in the embodiment of FIG. 4, the sensing system 50 may include, but is not limited to including, a thermal sensing system 52, an object sensing system 54, a receiver sensing system 56, electrical sensor(s) 57 and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the power transmitter 20 or other elements nearby the power transmitter 20. The thermal sensing system 52 may be configured to detect a temperature within the power transmitter 20 and, if the detected temperature exceeds a threshold temperature, the transmission controller 28 prevents the power transmitter 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the power transmitter 20 has increased from an acceptable operating temperature to an undesired operating temperature (e.g., in a non-limiting example, the internal temperature increasing from about 20° Celsius (C) to about 50° C., the transmission controller 28 prevents the operation of the power transmitter 20 and/or reduces levels of power output from the power transmitter 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the power transmitter 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the power transmitter 20. In some examples, the object sensing system 54 utilizes an impedance change detection scheme, in which the transmission controller 28 analyzes a change in electrical impedance observed by the transmission coil 21 against a known, acceptable electrical impedance value or range of electrical impedance values. Additionally or alternatively, in some examples the object sensing system 54 may determine if a foreign object is present by measuring power output associated with the power transmitter 20 and determining power input associated with a receiver associated with the power transmitter 20. In such examples, the object sensing system 54 may calculate a difference between the power associated with the power transmitter 20 and the power associated with the receiver and determine if the difference indicates a loss, consistent with a foreign object not designated for wireless power transmission.

Additionally or alternatively, the object sensing system 54 may utilize a quality factor (Q) change detection scheme, in which the transmission controller 28 analyzes a change from a known quality factor value or range of quality factor values of the object being detected, such as the receiver coil 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the power transmitter 20. In some examples, if the presence of any such wireless receiving system is detected, wireless transmission of electrical energy, electrical power, electromagnetic energy, and/or data by the power transmitter to said wireless receiving system is enabled. In some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the power transmitter 20 and, based on the electrical characteristics, determine presence of a power receiver 30.

The electrical sensor(s) 57 may include any sensors configured for detecting and/or measuring any current, voltage, and/or power within the power transmitter 20. Information provided by the electrical sensor(s) 57, to the transmission controller 28, may be utilized independently and/or in conjunction with any information provided to the transmission controller 28 by one or more of the thermal sensing system 52, the object sensing system 54, the receiver sensing system 56, the other sensor(s) 58, and any combinations thereof.

Figure 5:
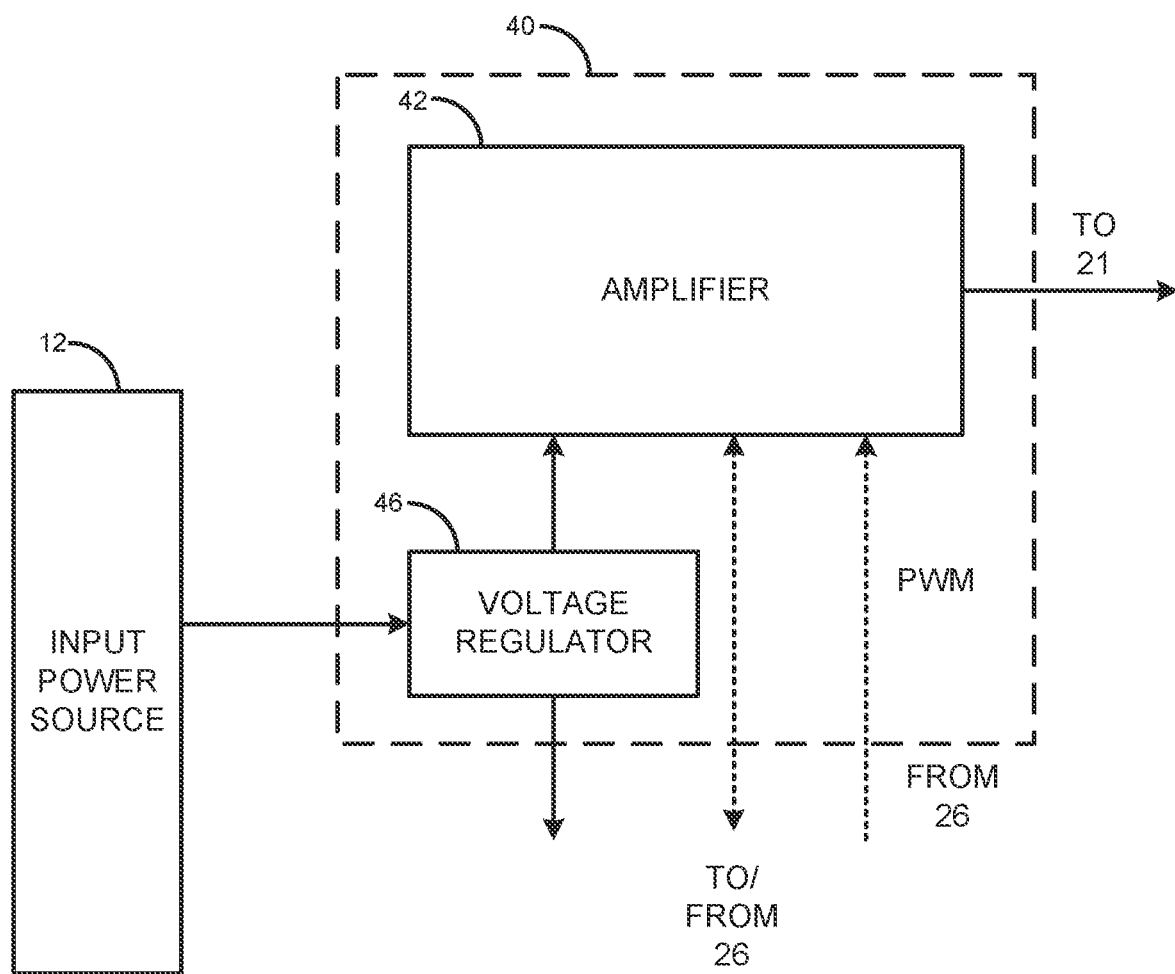
FIG. 5 is an exemplary block diagram for components of a power conditioning system of the power transmitter of FIGS. 1-2, in accordance with FIGS. 1-2 and an embodiment of the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the coil 21 and provide electrical power for powering components of the power transmitter 20. Accordingly, the voltage regulator 46 is configured to convert the received electrical power into at least two electrical power signals, each at a proper voltage for operation of the respective downstream components: a first electrical power signal to electrically power any components of the power transmitter 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the power transmitter 20.

The second portion of the electrical power is provided to an amplifier 42 of the power conditioning system 40, which is configured to condition the electrical power for wireless transmission by the coil 21. The amplifier may function as an inverter, which receives an input DC power signal from the voltage regulator 46 and generates an AC as output, based, at least in part, on PWM input from the transmission control system 26. The amplifier 42 may be or include, for example, a power stage inverter. The use of the amplifier 42 within the power conditioning system 40 and, in turn, the power transmitter 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 milliwatts (mW) to about 60 W.

Figure 6:
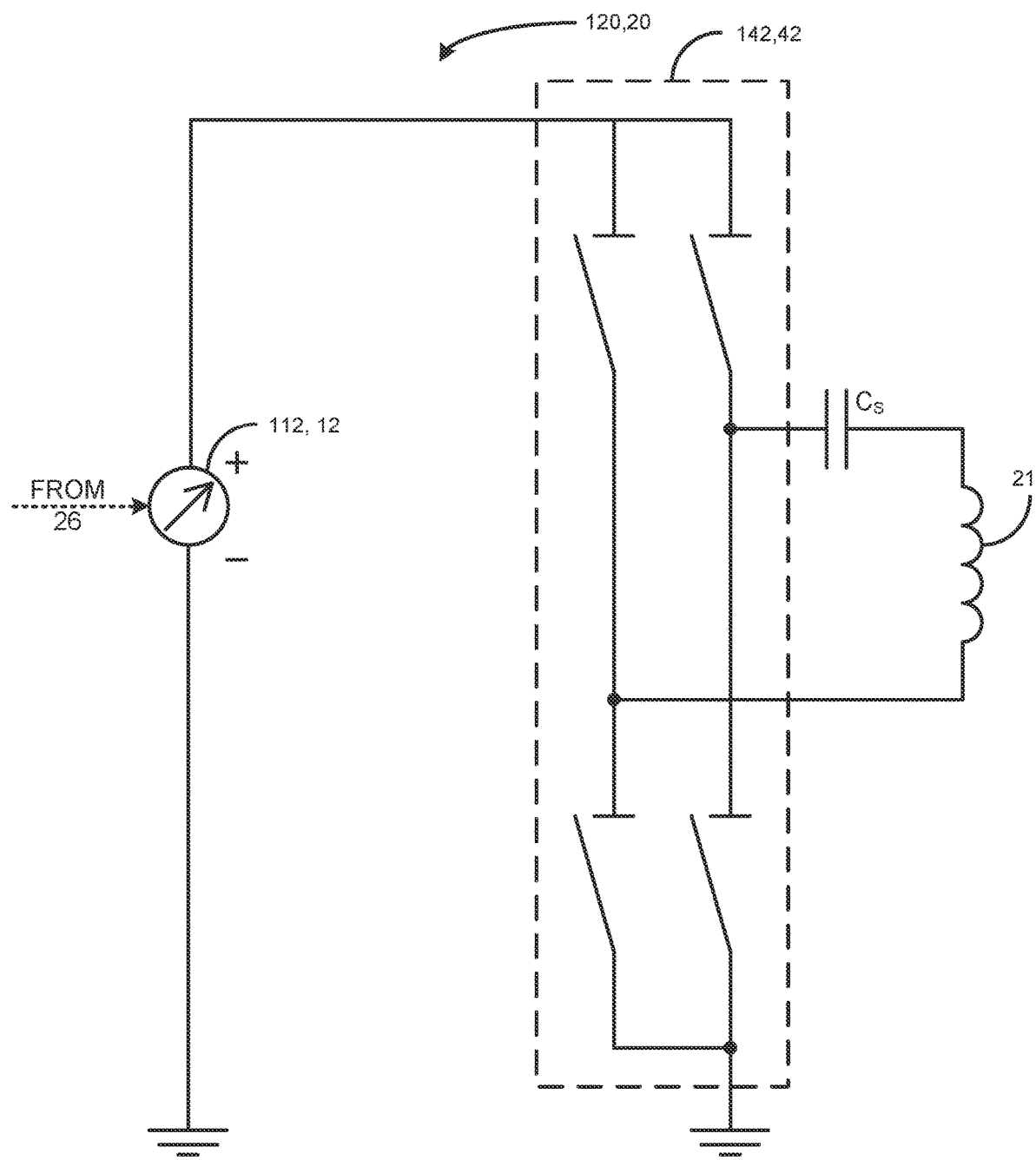
FIG. 6 is an exemplary electrical schematic diagram of components of the power transmitter of FIGS. 1-5, in accordance with FIGS. 1-5 and the present disclosure.

FIG. 6 is an exemplary schematic diagram 120 for an embodiment of the power transmitter 20. In the schematic, the amplifier 42 is a full-bridge inverter 142 which drives the transmitter coil 21 and a series capacitor Cs. In some examples, wherein the operating frequency of the power transmitter 20 is in the range of about 87 kHz and about 360 kHz, the transmitter coil 21 has a self-inductance in a range of about 5 µH to about 7 µH. In some such examples, Cs has a capacitance in a range of about 400 nF to about 450 nF.

Based on controls configured by the control and communications system 26, an input power source 112, embodying the input power source 12, is altered to control the amount of power transferred to the power receiver 30. The input voltage of the input power source 112 to the full-bridge inverter 142 may be altered within a range of about 1 volt (V) to about 19 V, to control power output. In such examples, the resolution of the voltage of the input power source 112 may be 10 millivolts (mV) or less. In some examples, when the power transmitter 20, 120 first applies a power signal for transfer to the power receiver 30, the power signal of the input power source 112 has an initial input power voltage in a range of about 4.5 V to about 5.5 V.

The transmitter coil 21 may be of a wire-wound type, wound of, for example, Litz wire. As defined herein, Litz wire refers to a type of multistrand wire or cable utilized in electronics to carry an alternating current at a frequency. Litz wire is designed to reduce skin effect and proximity effect losses in conductors at frequencies up to about 1 MHz and consists of many thin wire strands, individually insulated and twisted or woven together, following a pattern. In some examples, the Litz wire may be no. 17 American Wire Gauge (AWG) (1.15 mm) type 2 Litz wire, having 105 strands of no. 40 AWG (0.08 mm diameter), or equivalent wire. In some examples, the Litz wire used for the transmitter coil 21 may be a bifilar Litz wire. To that end, utilizing thicker Litz wire, such as the no. 17 AWG type 2 Litz wire, utilizing bifilar Litz wire, and combinations thereof, may result in an increased Quality Factor (Q) for the transmitter coil 21 and higher Q may be directly related to increases in gap 17 height and/or Z-Distance. As Q is directly related to the magnitude of the magnetic field produced by the transmitter coil 21 and, thus, with a greater magnitude magnetic field produced, the field emanating from the transmission antenna 21 can reach greater Z-distances and/or charge volumes, in comparison to legacy transmission coils, having lower Q designs. While Litz wire is described and illustrated, other equivalents and/or functionally similar wires may be used. Furthermore, other sizes and thicknesses of Litz wire may be used.

Figure 7:
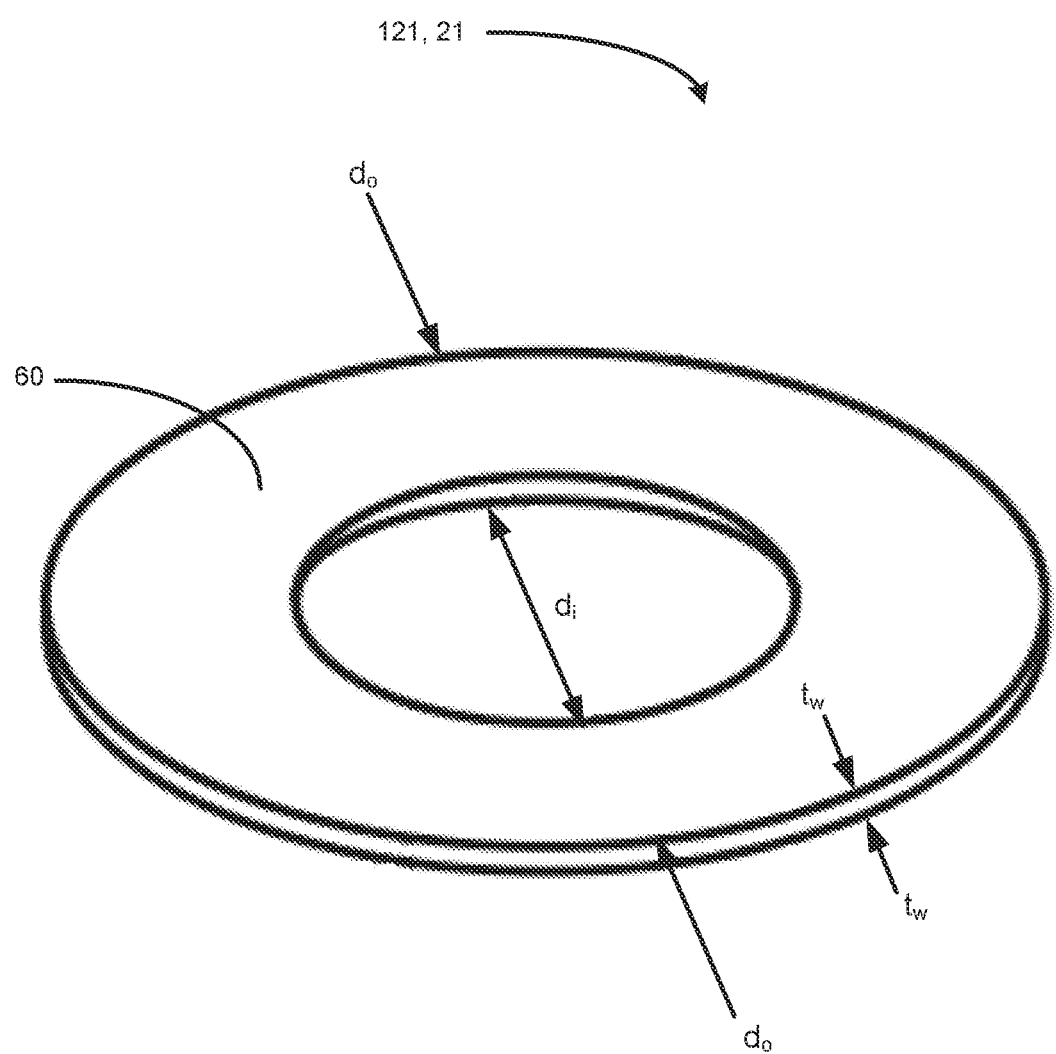
FIG. 7 is a perspective view of a shape of a transmitter coil of the power transmitter of FIGS. 1-6, in accordance with FIGS. 1-6 and an embodiment of the present disclosure.

Turning to FIG. 7, an exemplary diagram 121, for portraying dimensions of the transmitter coil 21, is illustrated. The diagram 121 is a top perspective view of the transmitter coil 21 and shows a top face 60 of the transmitter coil 21. Note that the diagram 121 is not necessarily to scale and is for illustrative purposes. The top face 60 and the transmitter coil 21, generally, are relatively circular in shape. As illustrated, an outer diameter $d_o$ is defined as an exterior diameter of the transmitter coil 21. In some examples, the outer diameter $d_o$ has an outer diameter length in a range of about 40 mm to about 65 mm. An inner diameter $d_i$ is defined as the diameter of the void space in the interior of the transmitter coil 21. The inner diameter $d_i$ may have an inner diameter length in a range of about 20 mm to about 45 mm. The outer diameter $d_o$ and the inner diameter $d_i$ may be relatively concentric, with respect to one another. The transmitter coil 21 has a thickness $t_w$, which is defined as the thickness of the wire of the coil. The thickness $t_w$ may be in a range of about 2 mm to about 3 mm. In such examples, the transmitter coil 21 may be made of Litz wire and include at least two layers, the at least two layers stacked upon each other. Utilization of one or more of an increased inner diameter $d_i$, an increased outer diameter $d_o$, multiple Litz wire layers for the antenna 21, specific dimensions disclosed herein, and/or combinations thereof, may be beneficial in achieving greater gap 17 heights and/or Z-distances. Other shapes and sizes of the transmitter coil 21 may be selected based on the configuration with the selection of the shape and size of the shielding of the transmitter coil. In the event that a desired shielding in required, the transmitter coil 21 may be shaped and sized such that the shielding surrounds the transmitter coil 21 in accordance with an embodiment.

Turning now to FIG. 8A, a cross-sectional view of the transmitter coil 21, within the base station 11 and partially surrounded by a shielding 80 of the transmitter coil 21, is illustrated. The shielding 80 comprises a ferrite core and defines a concave cavity 82, the concave cavity 82 configured such that the ferrite core substantially surrounds all but the top face 60 of the transmitter coil 21 when the transmitter coil 21 is placed in the cavity. As used herein, "surrounds" is intended to include covers, encircles, enclose, extend around, or otherwise provide a shielding for. "Substantially surrounds," in this context, may take into account small sections of the coil that are not covered. For example, power lines may connect the transmitter coil 21 to a power source. The power lines may come in via an opening in the side wall of the shielding 80. The transmitter coil 21 at or near this connection may not be covered. In another example, the transmitter coil 21 may rise slightly out of the cavity and thus the top section of the side walls may not be covered. By way of example, substantially surrounds would include coverage of at least 50+% of that section of the transmitter antenna. However, in other examples, the shielding may provide a greater or lesser extent of coverage for one or more sides of the transmitter coil 21.

Additionally, the transmitter coil 21 may be positioned within the concave cavity 82. "Positioned within," as defined herein, refers to a positioning of the transmitter coil 21, relative to the shielding 80, wherein at least 50% of the transmitter coil resides within the concave cavity 82. In some examples, wherein the transmitter coil 21 is positioned within the concave cavity 82, the top face 60 of the transmitter coil 21 is substantially unobstructed or uncovered by the shielding 80, such that the top face 60 is substantially uncovered.

In an embodiment, as shown in FIG. 8A, the shielding 80 surrounds at least the entire bottom section of the transmitter coil 21 and may fully or partially surround side sections of the transmitter coil 21. As used herein, the entire bottom section of the transmitter coil 21 may include, for example, the entire surface area of the transmitter coil 21 or all of the turns of the Litz wire of the transmitter coil 21.

Figure 10A:
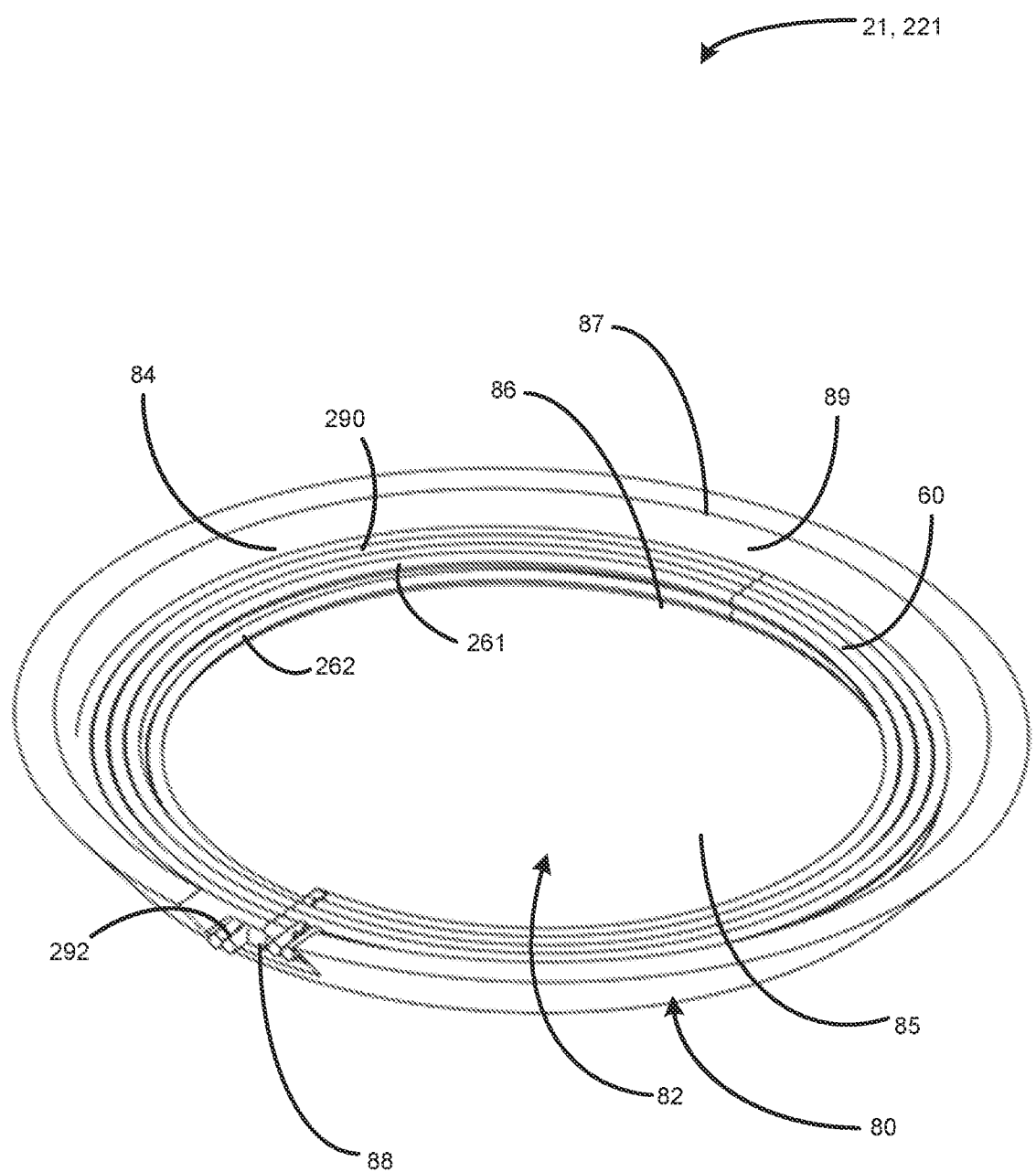
FIG. 10A is a perspective view of the transmitter coil of FIGS. 1-8 and the shielding of FIGS. 8 and 9, in accordance with FIGS. 1-9 and the present disclosure.
Figure 10B:
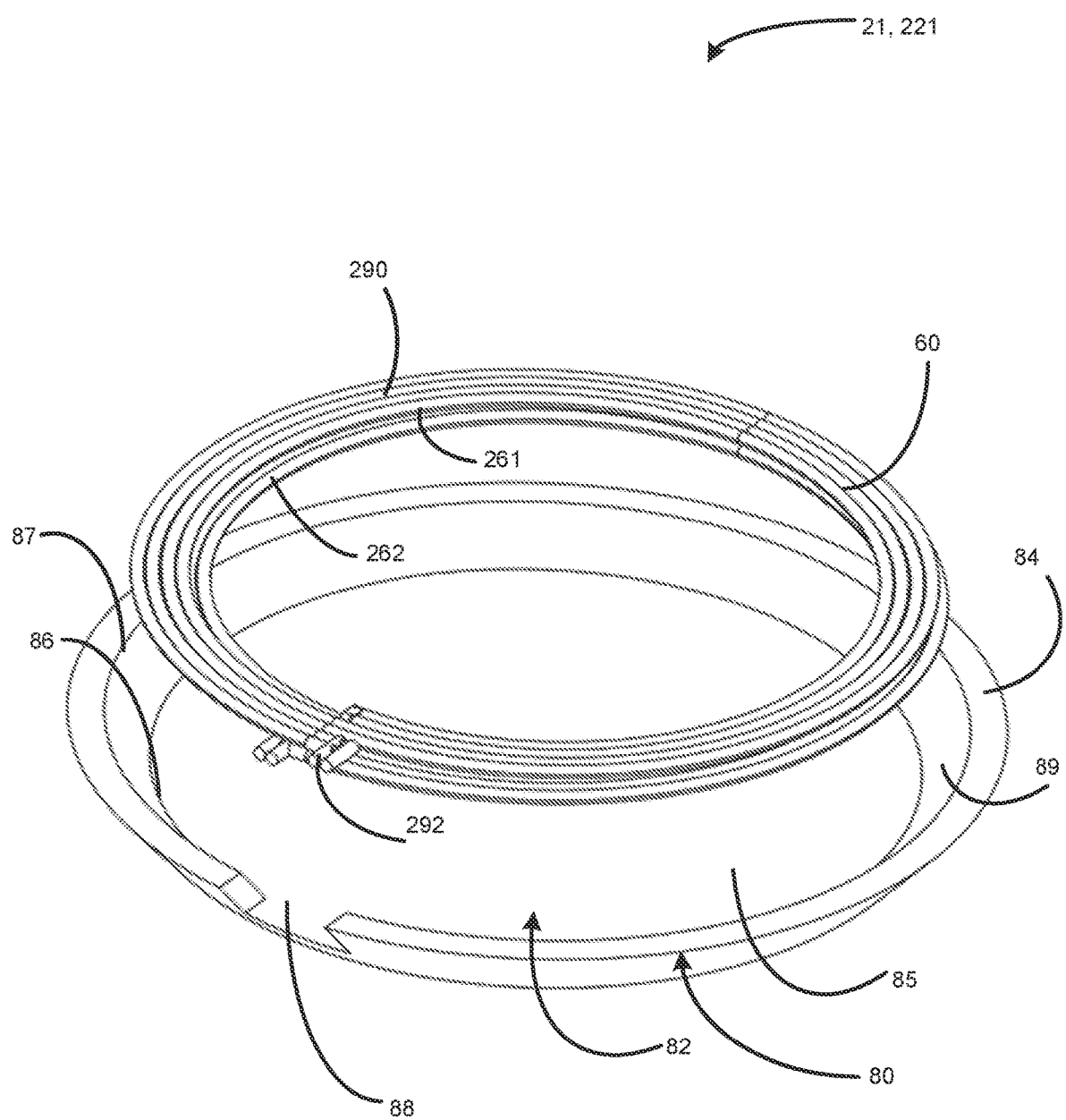
FIG. 10B is an exploded perspective view of the transmitter coil of FIGS. 1-8 and the shielding of FIGS. 8 and 9, in accordance with FIGS. 1-9 and the present disclosure.

In another embodiment, the shielding 80 may surround less than the entire bottom section of the transmitter coil 21. For example, connecting wires (e.g., connecting wires 292, as best illustrated in FIGS. 10A, 10B and discussed below) may be run through an opening in the bottom of the shielding 80.

In an embodiment, as shown in FIG. 8A, the shielding 80 is of a concave type shielding, wherein the cavity 82 and structural elements of the shielding 80 are configured such that a concave cavity is defined by the shape of the shielding 80, when the shielding is viewed, cross-sectionally, in a side view. The concave configuration is further illustrated in FIG. 9, which is a perspective view of the shielding 80. The shielding 80 may include a magnetic backing 85, and a magnetic ring 84.

Figure 9:
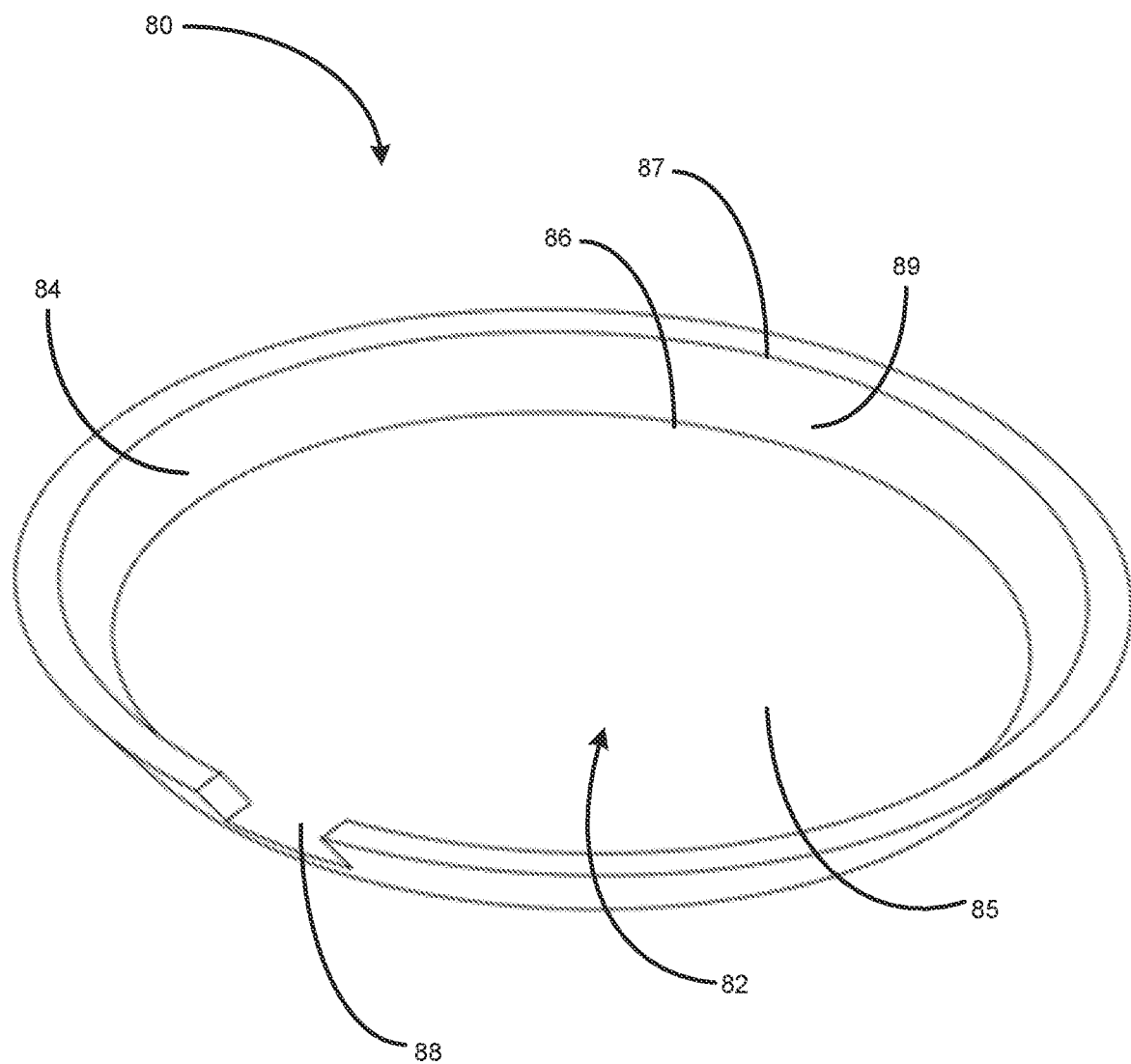
FIG. 9 is a perspective view of a shielding associated with the transmitter coil of FIGS. 1-8, in accordance with FIGS. 1-8 and an embodiment of the present disclosure.

Referring now to FIG. 8B, but with continued reference to FIGS. 8A and 9, an example embodiment of structural components of the magnetic ring is illustrated. The magnetic ring 84 defines a bottom portion 86, a top portion 87, and an inner side wall 88, which extends from the bottom portion 86 to the top portion 87. The inner side wall 88 has defines an outward extending shape, as illustrated, which extends radially outward from the bottom portion 86 towards the top portion 87. In other words, the inner side wall 88 has a shape that extends radially outward from the magnetic backing 85. The outward extending shape may be of any shape that extends outward and results in a shape suitable for defining the concave cavity 82.

In some examples, such as the embodiment of the inner side wall 88 in FIG. 8B, the outward extension of the inner side wall 88 may extend in both the length direction and the height direction at substantially constant or linear rates of extension and, thus, create a generally slope shaped or linear shape for the inner side wall 88. Alternatively, as illustrated in the embodiment of FIG. 8C, the outward extension of the inner side wall 88 may extend in one or both of the length direction and the height direction at inconsistent rates of extension and, thus, create a generally curved shape and/or rounded shape for the inner side wall 88. While generally slope shapes and curved shapes are illustrated FIG. 8, the inner side wall 88 shape may include any combination of slope shapes and curved shapes, so long as the inner side wall 88 is shaped extending radially outward from the magnetic backing 85.

In an embodiment, the cavity 82 is configured such that the shielding 80 covers the entire bottom section of the transmitter coil 21 and the some or none of the side sections of the transmitter coil 21. The top section of the transmitter coil 21 is not covered. The bottom section of the transmitter coil 21 is the side of the transmitter coil 21 that is opposite of the direction of the primary power transfer to the receiver coil. With a wire wound transmitter coil 21, the side section of the transmitter coil 21 includes the side section of the outer most winding of the coil 21.

FIG. 10A is a perspective view of the transmitter coil 21 and the embodiment of the E-core shielding of FIG. 9 and FIG. 10B is an exploded perspective view of the transmitter coil 21 and the embodiment of the E-core shielding of FIG. 9. The transmitter coil 21 is positioned above the shielding 80, whose combination of structural bodies, as discussed above, may include the combination of the magnetic backing 85 and the magnetic ring 84. This magnetic shielding combination functions to help direct and concentrate magnetic fields created by transmitter coil 21 and can also limit side effects that would otherwise be caused by magnetic flux passing through nearby metal objects. In some examples, the magnetic ring defines an opening 88, in which a connecting wire 292 of the transmitter coil 21 can exit the shielding 80.

As a result of the concave cavity 82 provided by the combination of the magnetic backing 85 and the inner side wall 88 of the magnetic ring 84, the shielding 80 may focus the magnetic fields generated by the transmitter coil 21 to be focused inward towards the center of the transmitter coil 21 and/or the base station 11. By focusing the magnetic fields inward, the transmitter coil 21 may be particularly useful and providing strong coupling with smaller receiver coils 31 and/or receiver coils 31 particularly positioned proximate to the center of the transmitter coil 21 and/or the base station 11. For example, as explained in detail below with reference to FIG. 11, a marking or mechanical indent may be positioned proximate to the center of the base station 11 and, when a user utilizes such features as intended, the transmitter antenna 21 will be able to achieve greater coupling with a receiver coil 31 thusly positioned, when compared to coupling provided with antennas that do not focus the magnetic fields inward, via a concave cavity shaped shielding.

As defined herein, a "shielding material," from which the shielding 80 is formed, is a material that captures a magnetic field. An example of which is a ferrite material. The ferrite shield material selected for the shielding 80 also depends on the operating frequency, as the complex magnetic permeability ($\mu=\mu'-j*\mu''$) is frequency dependent. The material may be a sintered flexible ferrite sheet or a rigid shield and be composed of varying material compositions. In some examples, the ferrite material for the shielding 80 may include a Ni—Zn ferrite, a Mn—Zn ferrite, and any combinations thereof.

Returning now to FIG. 8A, an interface surface 70 of the base station 11 is included. The interface surface 70 is a surface on the base station 11 that is configured such that when a power receiver 30 is proximate to the interface surface 70, the power receiver 30 is capable of coupling with the power transmitter 20, via near-field magnetic induction between the transmitter coil 21 and the receiver coil 31, for the purposes of wireless power transfer. As described in greater detail below, design features of the interface surface 70 may be included for interaction with such objects for aligning the power transmitter 20 and the power receiver 30 for operation.

Returning now to FIG. 10B, an exemplary coil 221 for use as the transmitter coil 21 is illustrated in the exploded view of the transmitter coil 21 and shielding 80. The coil 221 includes one or more bifilar Litz wires 290 for the first bifilar coil layer 261 and the second bifilar coil layer 262. "Bifilar," as defined herein, refers to a wire having two closely spaced, parallel threads and/or wires. Each of the first and second bifilar coil layers 261, 262 include N number of turns. In some examples, each of the first and second bifilar coil layers 261, 262 include about 3.5 turns and/or the bifilar coil layers 261, 262 may include a number of turns in a range of about 2 to about 5. In some examples, the one or more bifilar Litz wire 290 may be no. 17 AWG (1.15 mm) type 2 Litz wire, having 105 strands of no. 40 AWG (0.08 mm diameter), or equivalent wire. Utilization of multiple layers, thick Litz wire, bifilar Litz wire, and any combinations thereof, may result in the coil 21 achieving greater Q and/or may result in increases in gap 17 height and/or Z-distance between the coil 21 and a receiver coil.

Figure 11A:
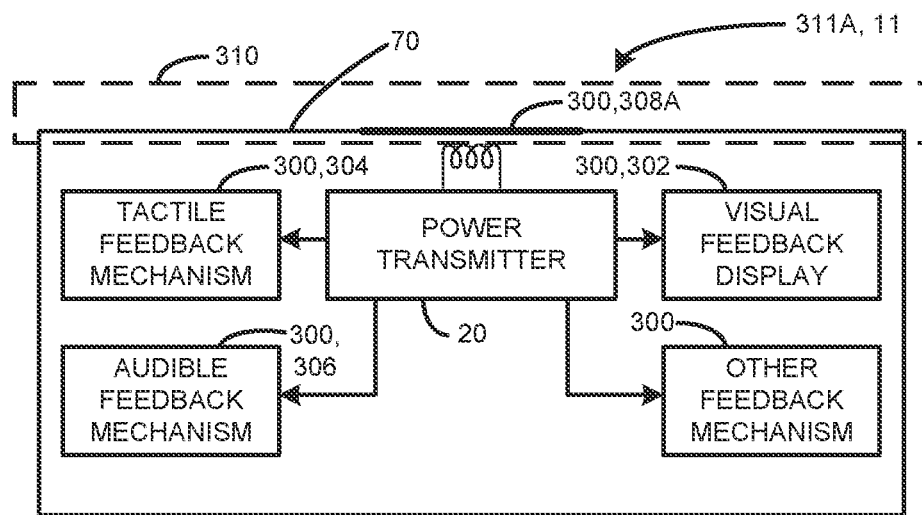
FIG. 11A is an exemplary block diagram for an embodiment of the base station of FIGS. 1-10 in accordance with FIGS. 1-10 and the present disclosure.

FIG. 11A is a first block diagram 311A for an implementation of the base station 11. As illustrated, the power transmitter 20 is contained within the base station 11. In some examples, the base station 11 includes one or more user feedback mechanisms 300, wherein each of the one or more user feedback mechanisms 300 are configured for aiding a user in aligning a power receiver 30 and/or its associated electronic device 14 with an active area 310 for wireless power transmission via the transmitter coil 21, wherein the power receiver 30 is configured to acquire near field inductive power from the transmitter coil 21. The "active area" 310, as defined herein, refers to any area, volume, and/or space proximate to the interface surface 70 wherein the power transmitter 20 is capable of transmitting near field inductive power to a power receiver 30.

The one or more user feedback mechanisms 300 may include one or more of a visual feedback display 302, a tactile feedback mechanism 304, an audible feedback mechanism 306, a marking 308 on the interface surface 70, any other feedback mechanisms 300, and any combinations thereof. The visual feedback display 302 is configured for visually indicating proper alignment of the power receiver 30 with the active area 310. The visual feedback display 302 may include, but is not limited to including, a visual screen, a light, a light emitting diode (LED), a liquid crystal display (LCD) display, other visual displays, and/or any combinations thereof. The tactile feedback mechanism 304 is configured for tactilely indicating if the power receiver 30 is in proper alignment with the active area 310. The tactile feedback mechanism 304 may include, but is not limited to including, a haptic feedback device, a vibrating device, other tactile feedback mechanisms, and any combinations thereof. The audible feedback device 306 is configured for audibly indicating if the power receiver 30 is in proper alignment with the active area 310. The audio feedback mechanism 306 may include, but is not limited to including, a speaker, a sound generator, a voice generator, an audio circuit, an amplifier, other audible feedback devices, and any combinations thereof.

The marking 308 may be any visual and/or mechanical signifier, indicating where a user of the electronic device 14 should place his/her/their electronic device 14 on the interface surface 70, such that the power transmitter 20 will be in proper alignment with the power receiver 30 of the electronic device 14. Additionally or alternatively, the marking 308 may indicate a location of the active area 310 and/or a proper location within the active area 70. In the exemplary embodiment of the diagram 311A, the marking 308A may be a substantially two-dimensional visual indicator marked on the interface surface 70. The substantially two-dimensional marking 308A may include, but is not limited to including, a printed indicator, a logo, a message indicating a user should place the electronic device 14 upon the marking 308A, any other substantially two-dimensional markings, and any combinations thereof.

Figure 11B:
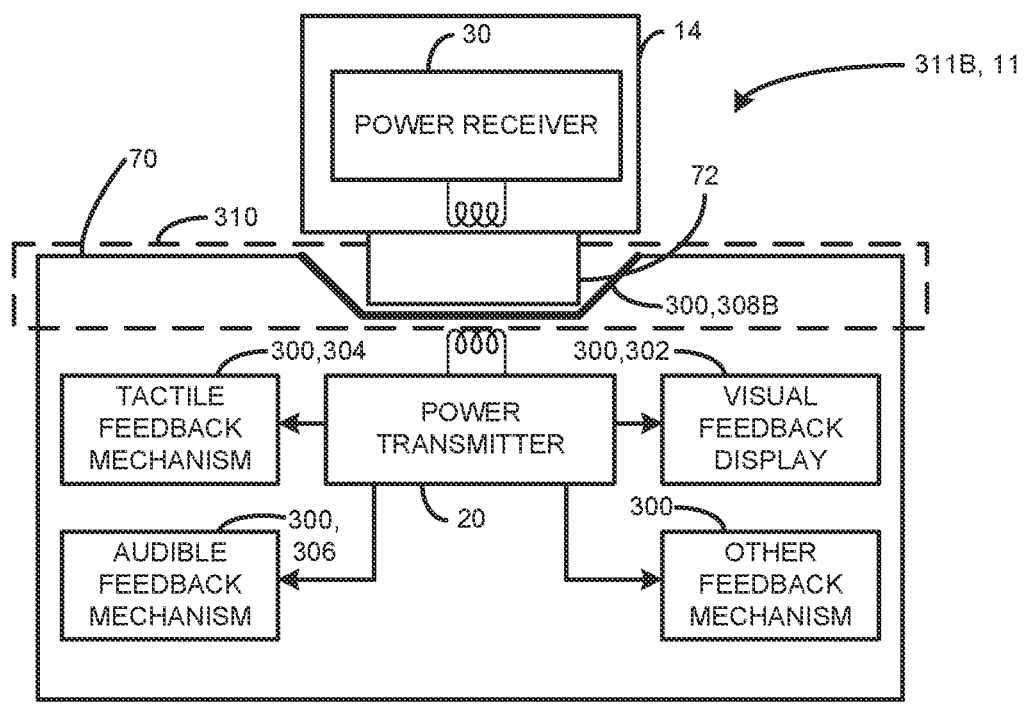
FIG. 11B is an exemplary block diagram for another embodiment of the base station of FIGS. 1-10 in accordance with FIGS. 1-10 and the present disclosure.

In an alternative embodiment in a second schematic block diagram 311B illustrated in FIG. 11B, the marking 308B is a substantially three-dimensional and/or mechanical marking 308B, such as, but not limited to, an indentation and/or notch in the interface surface 70. The three-dimensional marking 308B may be configured to interact with mechanical feature 72 of the electronic device 14. The mechanical feature 72 may be any mechanical feature of the electronic device 14 and/or another connected mechanical feature and/or device associated with the electronic device 14. Accordingly, interaction between the mechanical feature 72 and the three-dimensional marking 308B may be configured to align the power transmitter 20 with the power receiver 30 of the electronic device 14. For example, the mechanical feature 72 may be an external protrusion located relatively proximate to the power receiver 30 of electronic device 14 and the marking 308B is configured to receive the mechanical feature and, by the nature of such receipt, the power transmitter 20 and the power receiver 30 are properly aligned for near-field inductive wireless power transfer. In some such examples, the electronic device 14 is a mobile device, such as a smart phone and/or tablet computing device, and the mechanical feature 72 may be an externally attached grip device configured for gripping the electronic device 14 when in use. In such examples, the marking 308B is configured to receive the grip device mechanical feature 72 and enable proper alignment of the power transmitter 20 and the power receiver 30 for near-field inductive wireless power transfer while the removable mechanical feature 72 remains attached to the electronic device 14.

Wireless power transmitters utilizing transmitter coils designed, manufactured, and/or implemented in accordance with the teachings of the present disclosure have shown, in experimental results to generate a magnetic field capable of capture by a receiver coil, such as a standard Qi™ receiver coil, at an extended Z-distance of 9 mm. As discussed previously, Qi™ wireless transmitter coils typically operate between coil-to-coil distances of about 3 mm to about 5 mm. The shaped-magnetics of the transmitter coil 21 have shown to favorably reshape a magnetic field so that coil-to-coil coupling can occur at extended Z-distances, wherein the Z-distances are extended about 2 times to about 5 times the distance of standard Qi™ wireless power transmitters. Furthermore, the shaped-magnetics of the present application can extend coupling of present day a Qi™ wireless power transmitter at a Z-distance ranging about 5 mm to about 25 mm. Any of the concave shaped and/or additional or alternative custom shapes for the shielding 80, may successfully be used to reshape the magnetic field for extended Z-distance coupling by a minimum of a 5% compared to standard present-day power transmitters. In addition, any of the concave shaped and custom shapes previously discussed, each in conjunction with its relation to a coil to the magnetic has also may further increase z-direction coupling by at least another 5%. An embodiment comprising a structure, the structure comprising a coil and a magnetic material, wherein a gap between the coil and the magnetic material residing at the inner diameter of the coil comprises 2 mm, reshapes the magnetic field so that coupling increases by 5%.

As is discussed above, the transmitter coils 21, power transmitters 20, and/or base stations 11, disclosed herein, may achieve great advancements in Z-distance and/or gap 17 height, when compared to legacy, low-frequency (e.g., in a range of about 87 kHz to about 360 kHz) transmission coils, power transmitters, and/or base stations. To that end, an extended Z-distance not only expands a linear distance, within which a receiver may be placed and properly coupled with a transmitter, but an extended Z-distance expands a three-dimensional charging and/or operational volume ("charge volume"), within which a receiver may receive wireless power signals from a transmitter. For the following example, the discussion fixes lateral spatial freedom (X and Y distances) for the receiver coil, positioned relative to the transmitter coil, as a control variable. Accordingly, for discussion purposes only, one assumes that the X and Y distances for the base stations 11, power transmitters 20, and/or transmitter coils 21 are substantially similar to the X and Y distances for the legacy system(s). However, it is certainly contemplated that the inventions disclosed herein may increase one or both of the X-distance and Y-distance. Furthermore, while the instant example uses the exemplary range of 8-10 mm for the Z-distance of the base stations 11, power transmitters 20, and/or transmitter coils 21, it is certainly contemplated and experimental results have shown that the base stations 11, power transmitters 20, and/or transmitter coils 21 are certainly capable of achieving Z-distances having a greater length than about 10 mm, such as, but not limited to, up to 15 mm and/or up to 30 mm. Accordingly, the following table is merely exemplary and for illustration that the expanded Z-distances, achieved by the base stations 11, power transmitters 20, and/or transmitter coils 21, have noticeable, useful, and beneficial impact on a charge volume associated with one or more of the base stations 11, power transmitters 20, and/or transmitter coils 21.

Spatial Freedom Comparison

| | X-dist | Y-dist | Z-dist (min) | Z-dist (max) | Charge Vol. (min) | Charge Vol. (max) |
|---|---|---|---|---|---|---|
| Legacy | 5 mm | 5 mm | 3 mm | 5 mm | 75 mm$^3$ | 125 mm$^3$ |
| 11, 20, 21 (8-10 mm. ver.) | 5 mm | 5 mm | 8 mm | 10 mm | 200 mm$^3$ | 250 mm$^3$ |
| 11, 20, 21 (15 mm. ver.) | 5 mm | 5 mm | 10 mm | 15 mm | 250 mm$^3$ | 375 mm$^3$ |
| 11, 20, 21 (30 mm. ver.) | 5 mm | 5 mm | 15 mm | 30 mm | 375 mm$^3$ | 750 mm$^3$ |

Thus, by utilizing the base stations 11, power transmitters 20, and/or transmitter coils 21, the effective charge volume may increase by more than 100 percent, when compared to legacy, low-frequency wireless power transmitters. Accordingly, the base stations 11, power transmitters 20, and/or transmitter coils 21 may achieve large Z-distances, gap heights, and/or charge volumes that were not possible with legacy low frequency, but thought only possible in lower power, high frequency (e.g., above about 2 Mhz) wireless power transfer systems.

FIG. 13 is an example block diagram for a method 1200 for designing the power transmitter 20. The method 1200 includes designing and/or selecting the transmitter coil 21 for the power transmitter 20, as illustrated in block 1210. The method 1200 includes tuning the power transmitter 20, as illustrated in block 1220. Such tuning may be utilized for, but not limited to being utilized for, impedance matching.

The method 1200 further includes designing the power conditioning system 40 for the power transmitter 20, as illustrated in block 1230. The power conditioning system 40 may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 1240, the method 1200 may determine and optimize a connection, and any associated connection components, to configure and/or optimize a connection between the input power source 12 and the power conditioning system 40 of block 1230. Such determining, configuring, and/or optimizing may include selecting and implementing protection mechanisms and/or apparatus, selecting and/or implementing voltage protection mechanisms, among other things.

The method 1200 further includes designing and/or programing the control and communications system 26 of the power transmitter 20, as illustrated in block 1250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

FIG. 14 is an example block diagram for a method 2200 for manufacturing the power transmitter 20. The method 2200 includes manufacturing and/or selecting the transmitter coil 21 for the power transmitter 20, as illustrated in block 2210. The method 2200 includes tuning the power transmitter 20, as illustrated in block 2220. Such tuning may be utilized for, but not limited to being utilized for, impedance matching.

The method 2200 further includes manufacturing the power conditioning system 40 for the power transmitter 20, as illustrated in block 2230. The power conditioning system 40 may be designed and/or manufactured with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 2240, the method 2200 may include connecting and/or optimizing a connection, and any associated connection components, to configure and/or optimize a connection between the input power source 12 and the power conditioning system 40 of block 2230. Such determining, manufacturing, configuring, and/or optimizing may include selecting and implementing protection mechanisms and/or apparatus, selecting and/or implementing voltage protection mechanisms, among other things.

The method 2200 further includes designing and/or programing the control and communications system 26 of the power transmitter 20, as illustrated in block 2250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A power transmitter for wireless power transfer at an operating frequency selected from a range of about 87 kilohertz (kHz) to about 360 kHz, the power transmitter comprising:
    a control and communications unit;
    an inverter circuit configured to receive input power and convert the input power to a power signal;
    a shielding comprising a ferrite core including a magnetic backing and a magnetic ring, the magnetic backing and the magnetic ring, in combination, defining a concave cavity, the magnetic ring comprising a bottom portion, a top portion, and an inner sidewall between the bottom portion and the top portion, the inner sidewall defining an outward extending shape that extends radially outward from the bottom portion of the magnetic ring to the top portion of the magnetic ring; and
    a coil configured to transmit the power signal to a power receiver, the coil formed of wound Litz wire and positioned within the concave cavity of the shielding and radially inward from the inner sidewall of the magnetic ring, and
    wherein the outward extending shape of the inner sidewall focuses a magnetic field produced by the coil inward toward a center of the coil to enable coupling with the power receiver positioned proximate to the center of the coil.

2. The power transmitter of claim 1, wherein the outward extending shape defines one or more of a slope, a curve, or combinations thereof.

3. The power transmitter of claim 1, wherein the coil has an outer diameter length in a range of about 40 mm to about 65 mm.

4. The power transmitter of claim 1, wherein the coil has an inner diameter length in a range of about 20 mm to about 45 mm.

5. The power transmitter of claim 1, wherein the coil has a thickness in a range of about 2 mm to about 3 mm.

6. The power transmitter of claim 1, wherein the Litz wire is a bifilar Litz wire.

7. The power transmitter of claim 1, wherein the coil includes, at least, a first layer of the wound Litz wire and a second layer of the wound Litz wire.

8. The power transmitter of claim 7, wherein the first layer includes a first number of turns in a range of about 2 to about 5 turns, and wherein the second layer includes a second number of turns in a range of about 2 to about 5 turns.

9. The power transmitter of claim 1, wherein the Litz wire has a diameter in a range of about 1 mm to about 1.5 mm and includes a plurality of strands, the plurality of strands including a number of strands in a range of about 80 strands to about 120 strands.

10. The power transmitter of claim 9, wherein each of the plurality of strands has a diameter in a range of about 0.05 mm to about 0.1 mm.

11. A base station for a wireless power transfer system at an operating frequency selected from a range of about 87 kilohertz (kHz) to about 360 kHz, the base station comprising:
    an interface surface;
    a control and communications unit;
    an inverter circuit configured to receive input power and convert the input power to a power signal;
    a shielding comprising a ferrite core including a magnetic backing and a magnetic ring, the magnetic backing and the magnetic ring, in combination, defining a concave cavity, the magnetic ring comprising a bottom portion, a top portion, and an inner sidewall between the bottom portion and the top portion, the inner sidewall defining an outward extending shape that extends radially outward from the bottom portion of the magnetic ring to the top portion of the magnetic ring; and a coil configured to transmit the power signal to a power receiver, the coil formed of wound Litz wire and positioned within the concave cavity of the shielding and radially inward from the inner sidewall of the magnetic ring, and wherein the outward extending shape of the inner sidewall focuses a magnetic field produced by the coil inward toward a center of the coil to enable coupling with the power receiver positioned proximate to the center of the coil.

12. The base station of claim 11, wherein the interface surface is separated from the coil by an interface gap distance, the interface gap distance in a range of about 8 millimeters (mm) to about 10 mm.

13. The base station of claim 12, wherein the interface surface extends across substantially all of a top face of the coil.

14. The base station of claim 12, wherein the outward extending shape defines one or more of a slope, a curve, or combinations thereof.

15. The base station of claim 12, further comprising at least one user feedback mechanism configured for aiding a user in aligning the power receiver with an active area for wireless power transmission via the coil, the power receiver configured to acquire near field inductive power from the coil.

16. The base station of claim 15, wherein the at least one user feedback mechanism includes a mechanical feature configured to position the power receiver substantially in the center of one or more of the coil, the magnetic backing, the magnetic ring, or combinations thereof.

17. The base station of claim 15, wherein the at least one user feedback mechanism includes a marking on the interface surface to indicate the location of the active area.

18. The base station of claim 15, wherein the at least one user feedback mechanism includes a visual feedback display, this is configured to indicate proper alignment of the power receiver with the active area.

19. The base station of claim 15, wherein the at least one user feedback mechanism includes one or more of an audible feedback mechanism, a tactile feedback mechanism that is configured to indicated if the power receiver is in proper alignment with the active area or a tactile feedback mechanism that is configured to indicate if the power receiver is in proper alignment with the active area.

20. A power transmitter for wireless power transfer at an operating frequency selected from a range of about 87 kilohertz (kHz) to about 360 kHz, the power transmitter comprising:

a control and communications unit;

an inverter circuit configured to receive input power and convert the input power to a power signal;

a shielding comprising a ferrite core including a magnetic backing and a magnetic ring, the magnetic backing and the magnetic ring, in combination, defining a concave cavity, the magnetic ring comprising a bottom portion, a top portion, and an inner sidewall between the bottom portion and the top portion, the inner sidewall defining an outward extending shape that extends radially outward from the bottom portion of the magnetic ring to the top portion of the magnetic ring and defining one or more of a slope, a curve, or combinations thereof; and a coil configured to transmit the power signal to a power receiver, the coil formed of wound Litz wire and positioned within the concave cavity of the shielding and radially inward from the inner sidewall of the magnetic ring, the coil including a first layer of the wound Litz wire and a second layer of the wound Litz wire, each of the first layer and the second layer including a number of turns in a range of about 2 turns to about 5 turns, and wherein the outward extending shape of the inner sidewall focuses a magnetic field produced by the coil inward toward a center of the coil to enable coupling with the power receiver positioned proximate to the center of the coil.

* * * * *